US012587942B2

(12) United States Patent
Sabater et al.

(10) Patent No.: US 12,587,942 B2
(45) Date of Patent: Mar. 24, 2026

(54) METHOD FOR ROUTING DATA FROM AN APPLICATION CLIENT TO AN APPLICATION SERVER VIA A CORE NETWORK OF A CELLULAR NETWORK

(71) Applicant: Vodafone Group Services Limited, Newbury (GB)

(72) Inventors: Susana Maria Sabater, London (GB); Alan Law, London (GB); Alvaro Fructuoso, London (GB); Sergio Pozo, London (GB)

(73) Assignee: Vodafone Group Services Limited, Newbury (GB)

( * ) Notice: Subject to any disclaimer, the term of this patent is extended or adjusted under 35 U.S.C. 154(b) by 309 days.

(21) Appl. No.: 18/362,838

(22) Filed: Jul. 31, 2023

(65) Prior Publication Data

US 2024/0049103 A1 Feb. 8, 2024

(30) Foreign Application Priority Data

Aug. 8, 2022 (EP) ..................................... 22382767

(51) Int. Cl.
*H04W 40/04* (2009.01)
*H04L 45/745* (2022.01)
*H04W 72/0453* (2023.01)

(52) U.S. Cl.
CPC ........... *H04W 40/04* (2013.01); *H04L 45/745* (2013.01); *H04W 72/0453* (2013.01)

(58) Field of Classification Search
CPC .. H04W 40/04; H04W 72/0453; H04L 45/745
See application file for complete search history.

(56) References Cited

U.S. PATENT DOCUMENTS

| | | | | |
|---|---|---|---|---|
| 2021/0306939 A1* | 9/2021 | Zhang | ................... | H04W 40/32 |
| 2021/0385283 A1 | 12/2021 | Peyman | | |
| 2025/0016602 A1* | 1/2025 | Foti | ...................... | H04W 48/06 |
| 2025/0126057 A1* | 4/2025 | Colom Ikuno | ....... | H04L 45/306 |

FOREIGN PATENT DOCUMENTS

| | | |
|---|---|---|
| WO | 2021/141348 | 7/2021 |
| WO | 2022/021971 | 2/2022 |

OTHER PUBLICATIONS

EP Search Report for application No. 22382767.6 dated Jan. 23, 2023.

* cited by examiner

*Primary Examiner* — Derrick V Rose
(74) *Attorney, Agent, or Firm* — Workman Nydegger

(57) ABSTRACT

A method for routing data through a cellular network from an application client at a user equipment (UE) to an application server via the core network. The method comprises use of a network operator platform to configure the application client and the core network. The application client is configured to address a request for a communication session between the application client and the application server to a token Data Network Name (DNN). The core network is configured to route data addressed to the token DNN to a specified DNN. By providing the network operator with information on the origin and type of data traffic received from a UE (signalled by use of the token DNN, which may be specific to a given application session), the network operator can implement specific, customised handling and treatment of the data traffic as it passes through the cellular network.

16 Claims, 3 Drawing Sheets

METHOD FOR ROUTING DATA FROM AN APPLICATION CLIENT TO AN APPLICATION SERVER VIA A CORE NETWORK OF A CELLULAR NETWORK

CROSS-REFERENCE TO RELATED APPLICATIONS

This application claims priority from EP Patent Application No: 22382767.6, filed Aug. 8, 2022, which is expressly incorporated by reference herein in its entirety.

FIELD OF THE DISCLOSURE

A method for routing data through a cellular network from an application client at a User Equipment, UE, to an application server via the core network. The method makes use of enhanced routing options in 5G (fifth-generation technology standards for broadband cellular networks). The method allows a network operator to identify the provenance (including the specific application and UE) and type of data traffic received at a core network via a network slice as part of a communication session.

BACKGROUND TO THE DISCLOSURE

Different applications and services running at a user device may benefit from different network characteristics (for instance, service level requirements such as bandwidth and/or latency) to offer a better customer experience or for the application to function properly. For example, a video streaming service may benefit from high bandwidth but be less sensitive to latency, whereas online gaming applications may prioritise lower latencies. Under 3G or 4G (third- and fourth-generation, respectively, technology standards for broadband cellular networks) different applications typically utilise the same data bearer in order to provide a service, said data bearer offering a generic set of network characteristics. However, the option to optimise routing of data is provided in 5G (fifth-generation technology standards for broadband cellular networks).

5G provides a network architecture that allows for network slicing. Network slicing describes the provision of different channels (or 'slices') between a user device and the core network, or beyond to a data network where an application server resides. The use of network slicing provides a mechanism for multiplexing of virtual and independent channels on the same physical network infrastructure. Each network slice provides an end-to-end channel that may or may not be isolated from other slices. Each network slice can have different network characteristics, which can be tailored to fulfil the requirements of a particular application. Therefore, in principle, a particular network slice can be allocated by the network to provide the network characteristics most suited to the type of data traffic generated by a particular application or for a specific service.

Network slices are allocated according to a type of data traffic to be carried on the network slice. For instance, Application A may generate data traffic in a first specialised category of service with a preference for low latency. Application B may generate data traffic in a second specialised category of service with a preference for high bandwidth. Under 5G, Application A may be routed through a first network slice (optimised for traffic from applications that demand variable bandwidth rates but low or ultra-low latency), whereas Application B may be routed through a second network slice (optimised for applications with high bandwidth requirements). According to 3rd Generation Partnership Project (3GPP) standards, the routing from the UE via a network slice is allocated at the UE by consultation of stored UE Route Selection Policies (URSPs). Each URSP associates data of a particular type (or in a particular specialised category of service) to a particular network slice and Data Network Name (DNN).

Although appropriate selection of a network slice for routing data traffic can improve a user experience by tailoring network characteristics to a given application, further improvements are possible by network operator customised routing at the edge of the core network to the data network where the application server resides. Nevertheless, such network operator customised routing is only beneficial with some knowledge of the content of the data traffic and its origin. A number of applications may generate data traffic of the same type and in the same specialised category of service (and so be routed via the same network slice). Therefore, more information on the data traffic is required by the network operator for more precise differentiation in the treatment or routing of the data.

Although provision of information on the provenance and content of data traffic to the core network is specified within 5G standards, in practice this information tends to be obscured from the core network by privacy provisions imposed by operating systems at a user device (or UE). In particular, an application running at a UE may identify itself to the operating system of the UE, but operating systems typically do not pass on to the cellular network an identification of the specific type of network traffic or identify a particular application from which data originates. Loss of this information at the core network prevents the network operator from providing an optimum pathway for data associated with a particular application through the cellular network. Moreover, as the operating system at a user equipment cannot be aware of current network conditions, the operating system at a UE is not in a position to itself instruct particular handling of data through the cellular network. Thus, some of the benefits offered by 5G may be lost.

One option to overcome this issue is for the network to inspect data packets from a particular user, to identify the specific type of network traffic and its provenance. However, this is only feasible where the data traffic is not itself encrypted. Furthermore, such inspection can increase latency of through the cellular network data transmission.

Accordingly, there is required a method for routing data through a cellular network from an application client at a user equipment (UE) to an application server via the core network which overcomes these drawbacks, in order to provide the best possible experience for a user of the application provided via the application client.

SUMMARY OF THE DISCLOSURE

Against this background, there is provided a method for routing data through a cellular network from an application client at a user equipment (UE) to an application server via the core network according to claims 1 to 11. There is also described a computer program in line with claim 12, a UE in accordance with claim 13, a network entity (or system of network entities) according to claim 14, and a network operator platform according to claim 15.

Most generally, there is described a method for routing data through a cellular network from an application client at a user equipment (UE) to an application server via the core network. The network makes use of 5G capabilities, including network slicing. The method comprises use of a network operator platform to configure the application client and the core network. The application client is configured to address a request for a communication session between the application client and the application server to a token Data Network Name (DNN), in order to identify the application client and UE to an operator of the core network. The core network is configured to route data addressed to the token DNN to a specified DNN (implemented by the core network changing the token DNN for a specified DNN upon receipt of a request for establishment of a communication session addressed to said token DNN). By providing the network operator with information on the origin and type of data traffic received from a UE (signalled by use of the token DNN, which may be specific to a given application session), the network operator can implement specific, customised handling and treatment of the data traffic as it passes through the cellular network.

In a first aspect there is a method for routing data through a cellular network from an application client at a user equipment (UE) to an application server via the core network, the method comprising:

> receiving, at a network operator platform from a UE, an initial request for establishment of a communication session between the application client and the application server, the communication session to be routed via a network slice, the network slice for routing of data belonging to a category of data traffic sent from the application client to the application server;

> generating, by the network operator platform, configuration information for configuration of the application client for establishment of the communication session, the application client configuration information comprising:

>> an instruction to the application client to address a subsequent request for establishment of a communication session with the application server to a token Data Network Name, DNN;

> generating, by the network operator platform, configuration information for configuration of the core network for establishment of the communication session, the core network configuration information comprising:

>> an instruction for the core network to change the token DNN for a specified DNN upon receipt of a request for establishment of a communication session addressed to said token DNN;

>> an instruction for the core network to generate a UE Route Selection Policy, URSP, to be sent to the UE, the generated URSP rule associating the category of data traffic sent from the application client to the application server with the token DNN and the network slice;

> configuring the application client according to the application client configuration information;

> configuring the core network according to the core network configuration information, thereby causing the core network to send the generated URSP to the UE to be stored in a URSP repository at the UE;

> wherein after configuring the application client and the core network, the subsequent request for establishment of a communication session between the application client and the application server is sent from the application client via the network slice, indicating the category of data traffic and addressed to the token DNN, the core network identifying information on the data in the communication session and the application client from which it is routed by receipt of the token DNN, in order to facilitate specific handling or treatment for the communication session by the network operator.

In other words, before establishment of a communication session with the application server, a communication session is first established with a network operator platform. The network operator platform generates configuration information used to reconfigure the application client and the core network for data routing of in a subsequent communication session between the particular application client and the application server. One item of configuration information generated by the network operator platform is a token DNN, which is generated taking into account the identity of the application client and the UE. During configuration, the token DNN is sent to the application client from the network operator platform, to be used in a subsequent request for establishment of a communication session with the application server. The token DNN is also sent to the core network, to permit the core network to recognise the origin of data transmitted in a subsequent data session. The core network is further configured by the network platform so that once a request is received to establish the subsequent communication session, the core network replaces the token DNN with a specified or predetermined 'real' DNN for the data network in which the application server resides.

Receipt of a request with a specific data type and addressed to the token DNN at the core network signals to the network operator information on the application client and UE, as well as the type of data to be routed through the communication session By obtaining knowledge of the origin and nature of data sent in the subsequent communication session, the network operator can customise the handling of the data through the cellular network. In particular, the handling can be optimised for a given application. This in turn improves the overall experience for an end-user making use of that particular application.

Preferably, the cellular network has 5G (fifth-generation technology standards for broadband cellular networks) capability. The application client will be understood to be a software element at a UE (being a user equipment such as a mobile device or computer). The application client transmits, processes and receives data from an application server, in order to provide the functions of an application to an end user of the UE.

The network operator platform is an entity of the cellular network providing functionality to expose core network capabilities that can be used by the network operator itself or by third-parties. The network operator platform is an entity that allows a network operator, as well as third-party developers and engineers, to monitor, adapt and program aspects of the network and data routing.

A communication session may describe any connection for data routing between two entities (here between the application client and the application server) through a cellular network. In 5G, the communication session may be a PDU session, which provides an end-to-end connectivity between an element or application at the UE and a specific data network (such as the internet, or a private network) via the User Plane Function (UPF) of the core network. The data network to be accessed is identified or addressed by a Data Network Name (DNN). In 5G, a given PDU session takes place over a single network slice and is connected to a DNN. A communication session request is sent by a UE and addressed to a given DNN, directed via a particular network slice according to UE Route Selection Policy (URSP). URSP are routing rules stored in a repository at the UE. The URSP may be preconfigured in a UE, may be sent or updated from the core network (for instance, although not exclusively, when a UE registers with or connects to an operator's network).

The method may further comprise steps of:

receiving, at the core network, the subsequent request for establishment of a communication session from the application client via the network slice and addressed to the token DNN according to the generated URSP;

changing, at the core network, the token DNN for the specified DNN;

establishing a communication session between the application client and the application server via the specified DNN and the network slice and having network assigned attributes.

In particular, at the UE the request for establishment of a communication session makes use of the generated URSP and the token DNN together with the application data type. In turn and according to the previous configuration by the network operator platform, the core network then exchanges the token DNN for a real, specified DNN. Consequently, the network slice extends from the UE to the edge of the core network (which could be a Multi-Access Edge Computing (MEC) server or a peered connection to the application server), and the data traffic may undergo specific handling or treatment during routing through the network.

The configuration information for configuration of the core network may further comprise one or more of:

an instruction for the core network to associate the subsequent request for establishment of a communication session with a UE subscription for use of the network slice;

an instruction to alert the network operator platform of changes in the geographical location of the UE;

an instruction to alert the network operator platform if the application is started or stopped;

an instruction to alert the network operator platform of network conditions that may affect the quality of service relevant to the application client; and information relating to a Domain Name System, DNS, server at the core network to be used to resolve an IP address for the application server during establishment of a communication session.

In other words, additional configuration information can be used to allow more precise charging to a user, to change the routing of data traffic in the communication session upon UE mobility or upon considering the application server conditions and/or the network conditions, or upon starting or stopping of the application related to the application client. The configuration information may further be used to change further characteristics of the routing through the core network to improve quality of service measures or quality of experience more generally.

The configuration information for configuration of the application client may further comprise:

an instruction to use DNS over Hypertext Transfer Protocol Secure, HTTPS, to address the DNS server; and/or information relating to a Domain Name System, DNS, server at the core network to be used to resolve an Internet Protocol, IP, address for the application server during establishment of a communication session.

DNS over HTTPS may be used to provide greater privacy for the communication session. The information relating to a DNS server may include identification of a DNS server at the core network.

The core network configuration information and/or application client configuration information may be generated by interaction by the network operator platform with network repositories and configuration nodes at the core network in view of a generic identifier derived from an identifier of the UE and an identifier associated with the application client requesting access to the network slice. As such, the configuration information (including the token DNN) is bespoke to the application at the application client and the UE, and maybe time limited or application specific.

After the step of receiving the initial request for establishment of a communication session between the application client and the application server, the method may further comprise:

obtaining, by the network operator platform from the application client, authorisation from an end user of the application client to share information to identify to the core network a provenance of data originating from the application client;

obtaining, from the network operator platform from the core network, authorisation for the application client to use the network slice.

Authorisation is obtained from the end user so as to mitigate privacy concerns from passing information on the provenance and type of data traffic from the application client to the core network. In particular, the end user is required to opt in voluntarily for the application traffic at the user device to be handled in a particular way.

Obtaining the authorisation from an end user of the application client to share information to identify to the core network a provenance of data originating from the application client may further comprise receiving, from the application client as authorisation, an application identifier associated with the application client requesting access to the network slice; and obtaining the authorisation for the application client to use the network slice may further comprise receiving, as authorisation, a UE identifier corresponding to a subscription of the UE to use the network slice;

wherein the core network configuration information and/or application client configuration information being generated by interaction by the network operator platform with network repositories and configuration nodes at the core network in view of an identifier of the UE and an identifier associated with the application client requesting access to the network slice may further comprise:

constructing a generic identifier from the UE identifier and the application identifier;

wherein the configuration information for configuration of the application client and for configuration of the core network is generated by interaction by the network operator platform with network repositories and configuration nodes at the core network using the generic identifier.

In other words, the configuration information is generated with knowledge of the application associated with the application client and with knowledge of the UE. This allows the configuration information to be customised so that the routing of data traffic between the application client and the application server provides the optimum user experience. The configuration information (and so data routing) may further be customised to ensure that regulatory requirements are met (such as retaining of data within the European Union in order to comply with GDPR regulations).

Once a generic identifier has been constructed, the core network configuration information generated by the network operator platform may further comprise an instruction to the core network to store the generic identifier together with subscriber data associated with the network slice and the specified DNN. In other words, the core network will associate the generic identifier with the subscriber, the network slice allowed to be used by the subscriber, and with both the token DNN and the specified DNN. This allows the network operator (via the core network) to have knowledge of the origin and nature of the data traffic in subsequent communication session.

The initial request for establishment of a communication session between the application client and the application server may be routed between the application client and the network operator platform via the network slice and addressed to a network operator platform DNN. In a particular example, the initial request for establishment of a communication session between the application client and the application server may be routed from the UE according to an initial URSP stored in the URSP repository in the UE, the initial URSP associating the category of data traffic sent from the application client in the particular UE with the network operator platform DNN and the network slice. For instance, the application client generates data of a particular data type which, according to the initial URSP, is routed to the network operator platform (addressed with the network operator platform DNN) and via the network slice associated with said particular data type.

The initial URSP may be updated in or added to the URSP repository at the UE upon an initial registration of the UE with the core network, or may be preconfigured in the URSP repository at the UE by a network operator prior to initial registration of the UE with the core network. The generated URSP and initial URSP may have relative rule precedence values that forces evaluation of the generated URSP before the initial URSP.

In a second aspect there is described a computer program, comprising instructions for routing data through a cellular network from an application client at a User Equipment, UE, to an application server via the core network when operated by a processor of a UE, a network operator platform or an entity or system of entities of a core network of a cellular network, the instructions causing the processor to carry out the above described method.

In a third aspect there is a User Equipment, UE, in a cellular network and comprising an application client, configured to operate in accordance with the above described method.

In a fourth aspect there is an entity or system of entities of a core network of a cellular network, configured to operate in accordance with the above described method.

In a fifth aspect there is a network operator platform, configured to operate in accordance with the above described method.

In a fifth aspect, there is a cellular network including a UE, a network operator platform and core network entities that are each configured to operate in accordance with the above described method.

BRIEF DESCRIPTION OF THE FIGURES

The disclosure may be put into practice in a number of ways and preferred embodiments will now be described by way of example only and with reference to the accompanying drawings, in which.

In the drawings, like parts are denoted by like reference numerals. The drawings are not to scale.

DETAILED DESCRIPTION OF CERTAIN EMBODIMENTS WITHIN THE DISCLOSURE

Figure 1:
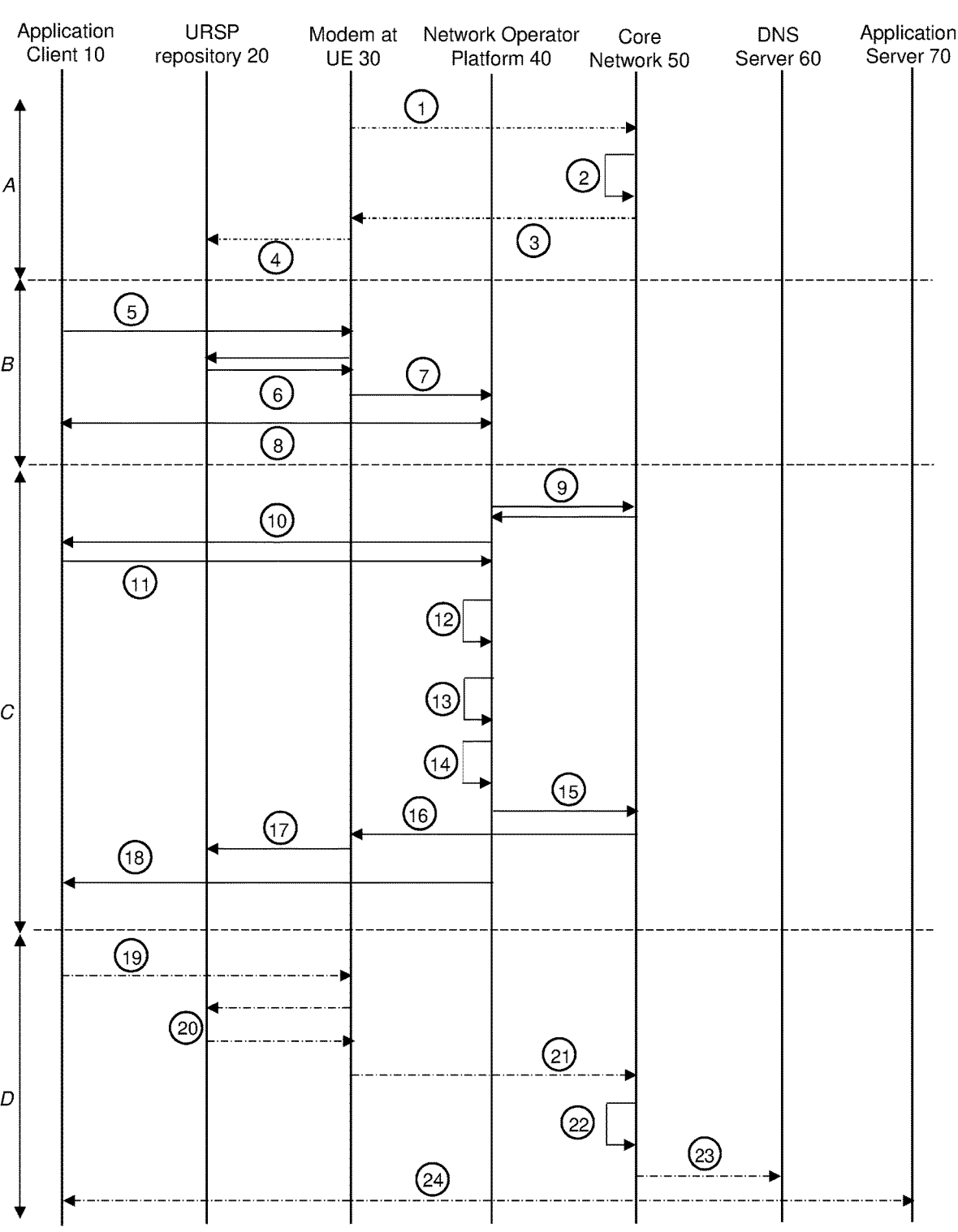
FIG. 1 shows a flow diagram showing steps in an example of the method for routing data through a cellular network from an application client at a user equipment (UE) to an application server via the core network.

A user may be subscribed to specialised services provided by a network operator. For instance, a user may be subscribed to a network package to allow an improved user experience for streaming applications, or for gaming applications.

A method is provided to route data through a cellular network from an application client at a user equipment (UE) to an application server via the core network. The method looks to provide the best possible user experience, in particular taking advance of the more adaptable network routing available in 5G. The method allows the core network to identify the origin and nature of data routed therethrough, without relying on the UE's operating system to provide specific information on the content or provenance of data packets.

In the described method, the routing of data from the UE to the edge of the core network takes place through a network slice allocated to a specialised category of service required by the application. Each network slice is provided having network characteristics optimised for said category of service. Nevertheless, differentiation of data traffic by specialised category of service is not especially precise, as a number of different applications may generate data that fits within the same category of service. Accordingly method of this disclosure allows the core network to receive additional information on the provenance and nature of data traffic routed through the cellular network (both information of the UE and the application from which the data originates). This permits a network operator, having visibility of network conditions, to route the data in a specialised or bespoke way (especially through the core network) so as to provide improved conditions for operation of a specific application and consequently a better user experience.

The method utilises a network operator platform, in order to configure entities in the cellular network and at the UE involved with establishment of a communication session. In particular, in an initial configuration phase the network operator platform reconfigures the application client and the core network in view of an identifier of the UE and an identifier associated with the application client. More specifically, the network platform generates a token Data Network Name (DNN) to be addressed in a request by the application client when establishing a communication session with the application server. The token DNN, when received by the core network, is treated as an identifier of the originating application and UE. The core network exchanges the token DNN for a true DNN, whilst knowledge of the provenance of the data traffic can be used by the network operator to allocate a more accurate or bespoke routing of the data through the cellular network.

In certain examples, knowledge of the origin or nature of data traffic in a communication session allows the data to be directed to a specific peering point or server that may have been established by means of agreements between a network operator and the application provider. In addition or alternatively, the data traffic can be re-routed under control of the network operator (for instance, in view of user mobility, or network congestion). In still further examples, the knowledge of the origin or nature of the data traffic permits the data traffic to be provided special treatment, for instance to use a different radio type, or to split the traffic into fixed and mobile access, or to be given a guaranteed bit rate that might have been agreed in contract with the user or the application provider. Finally, this knowledge may allow the operator to monetise specific data traffic with more precision or granularity.

The configuration and configuration information generated as part of the disclosed method may be application-session specific, time limited, or perpetual. The configuration according to the method may be persistent across more than one application session.

As outlined here, the method is described in more detail in four phases, as follows:

A. Subscriber registration;
B. Establishment of a communication session with the network operator platform;
C. Configuration; and
D. Execution.

The steps of each phase are described in more detail below, although not all steps are essential for the implementation of the invention. A flow diagram of the steps of the method is shown in FIG. 1.

It will be understood that phase A (subscriber registration) may form part of an initial registration of the UE with the core network. Phase B and C (establishment of a communication session with the network operator platform & configuration) relate to the configuration of the system according to the method, and Phase D relates to establishment of a communication session within the configured system.

Phase A: Subscriber Registration

This phase registers a User Equipment (UE) with the network operator, in order to identify the user as being a subscriber to a specific service or services provided by the network operator.

The steps of phase A are:

Step 1: A registration request is sent from a UE 5 to the core network 50. The request may be sent from either the modem 30 or the UE high-layer software, dependent on the specific implementation. Typically the registration request is sent from the modem layer but the contents of the registration request may be generated by other layers in the UE 5.

Step 2: The subscriber details are checked (with the UDM (Unified Data Management) in the core network 50) to verify whether the user is subscribed to use one or more network slice, each network slice to be used to route data traffic in a particular specialised category of service.

Step 3: A registration accept message is sent by the core network 50 to the UE 5, the registration accept message comprising a list of network slices allowed for use by the UE 5. The list of network slices includes one or more specific network slice 100 to be used by a respective one or more specialised category of service. Each of the one or more specialised category of service may have a different set of network characteristics (such as different bandwidth, latency etc.). Each network slice can be identified by the S-NSSAI (Single-Network Slice Selection Assistance Information), which can be related to a specific specialised category of service. For instance, a first specific network slice, denoted S-NSSAI-a 110, is for use by a first specialised category of service.

Step 4: Optionally, the core network 50 returns to the UE 5 one or more new URSP (UE Route Selection Policy). The one or more new URSP is stored in a URSP repository 20 at the UE 5. In general, each URSP associates data traffic classified within a given one of the one or more specialised category of service with a particular network slice and Data Network Name (DNN). Within the disclosed method, the one or more new URSP includes a first URSP that associates data traffic in a first specialised category of service with network slice S-NSSAI-a, and with network operator platform DNN, op_platform_DNN.

Phase B: Establishment of a Communication Session with the Network Operator Platform In this phase, an initial communication session (PDU session) is established between the application client and the network operator platform. The network operator platform is an entity allowing developers to interact with the operator's network and ultimately to design applications or products that can select and define network requirements for their use.

The steps of phase B are:

Step 5: The application client 10 requests establishment of a communication session with the application server 70 for the particular application, the data traffic from said application belonging to the first specialised category of service (first data type).

Step 6: The UE 5 (more specifically, the modem 30) consults the URSP repository 20 to determine how to route the application client request. The modem 30 identifies a URSP appropriate to the particular specialised category of service. In the present example, the first URSP (updated in the URSP repository 20 in phase A) is identified as being appropriate to the first specialised category of service. The first URSP associates the application client request, which includes an indicator of the first specialised category of service as a traffic descriptor, with the network operator platform DNN (op_platform_DNN) and the network slice S-NSSAI-a. An example of the first URSP is:

| | |
|---|---|
| Rule Precedence = x | Route Selection Descriptor Precedence = 1 |
| Traffic Descriptor: | Network Slice Selection: S-NSSAI-a |
| Connection Capabilities = | DNN Selection: op_platform_DNN |
| "first specialised | Access Type preference: 3GPP access |
| service category" | |

Step 7: The request for establishment of the communication session is sent from the UE 5 to the network operator platform 40 via network slice S-NSSAI-a 110 and addressing op_platform_DNN, according to the first URSP.

Step 8: Said initial communication session is established between the application client 10 at the UE 5 and the network operator platform 40.

Phase C: Configuration

Figure 2:
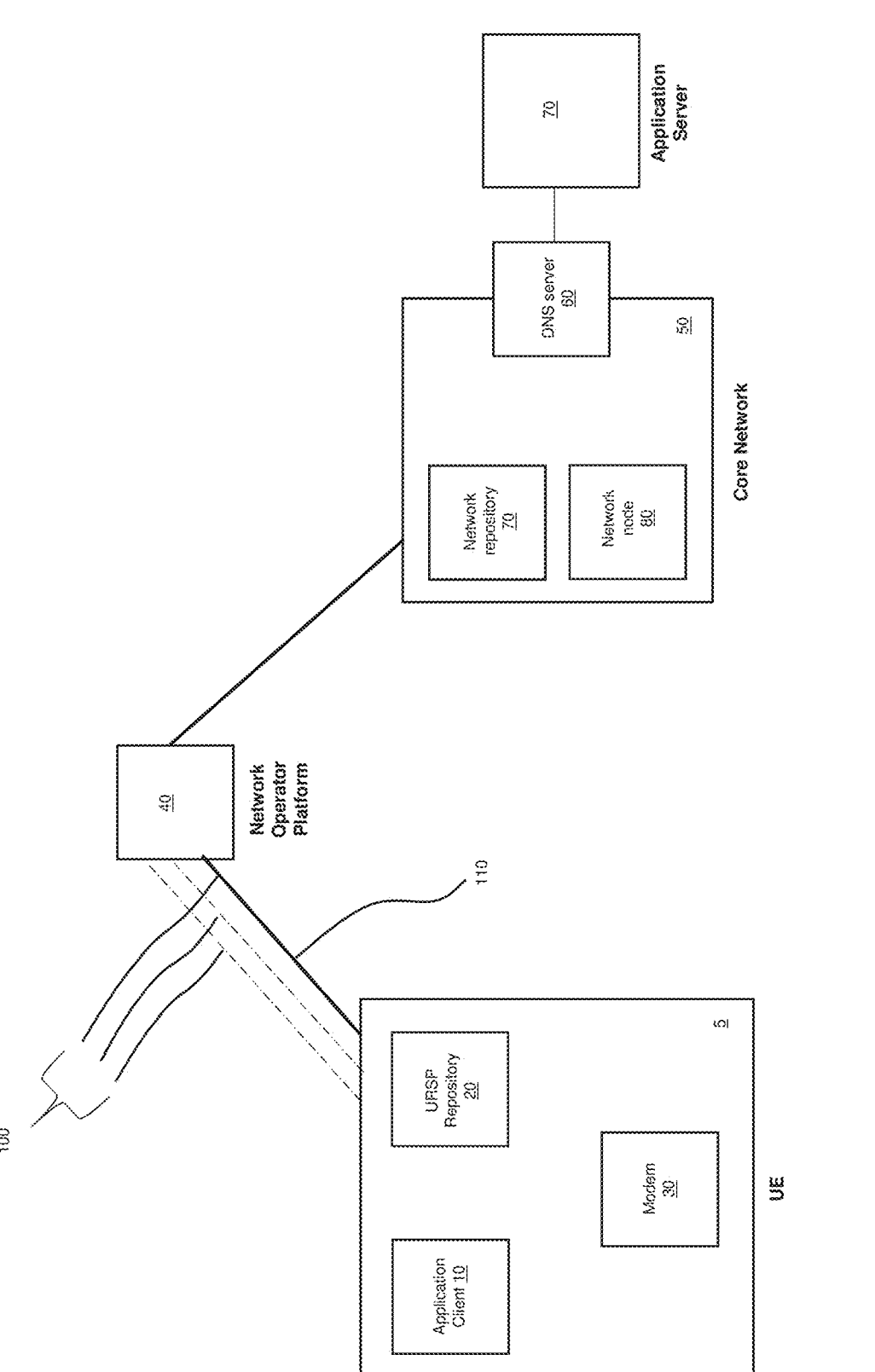
FIG. 2 shows elements of the system to be configured, during a configuration phase.

Within the initial communication session that was established in phase B, in phase C the network operator platform acts to authorise the special treatment of data traffic from the application, and to configure the application client, the UE and the core network to allow a subsequent communication session to be established through the preferred network slice whilst informing the network of the provenance and nature (including identifying the originating UE and application) of the data traffic. Entities during the configuration phase C are depicted in FIG. 2.

The steps of phase C are:

Step 9: The network operator platform 40 requests, and receives, from the core network 50 an authorisation for the application client 10 to use a particular network slice. For instance, in the present example the network operator platform 40 requests authorisation to use network slice S-NSSAI-a 110 allocated to the first specialised category of service.

Step 10: The network operator platform 40 requests from an end user of the UE 5 via the application client 10 an authorisation for special routing of the data generated during the requested communication session and/or authorisation to share information that allows the origin of the data traffic from the application client 10 to be identified by the network operator.

Step 11: The application client 10 returns to the network operator platform 40 an identifier of the application client 10 (here denoted client_ID) as the authorisation, including an identification of the specialised category of service it intends to use.

Step 12: The network operator platform 10 constructs a generic identifier for the application and the user (here denoted generic_ID), to be used during the lifetime of the requested communication session. The generic identifier (generic_ID) is generated based on both the application client identifier (client_ID) and a UE identifier (UE_ID). The UE identifier can take various forms, including the Subscription Permanent Identifier, SUPI (equivalent in 5G to the International Mobile Subscriber Identity, IMSI, in 4G), or the Mobile Station International Subscriber Directory Number, MSISDN (which is the phone number of the subscriber). In an example, the core network records the SUPI in its repositories from the first connection of a user with the network operator, but this identifier can be passed to the network operator directly by the application client or UE during the authorisation phase at step 10.

Step 13: The network operator platform 10 constructs a betokened DNN (here denoted token_DNN). This can be thought of as a pseudo DNN or dummy DNN, which is not a real network address. The betokened DNN is used to configure and warn (or signal to) the core network 50 that the specialised category of service is being used by the application, and also to identify the application client 10 and UE 5 to the network operator when receiving at the core network 50 a request addressed to the betokened DNN.

Step 14: Using the generic identifier (generic_ID), the network operator platform 40 interacts with one or more network repositories 70 and/or network configuration nodes 80 to configure and prepare the core network 50 for a communication session initiated by the application client 10 at the UE 5. Said network repositories 70 and network configuration nodes 80 may include the UDM (Unified Data Management), UDR (Unified Data Repository), NEF (Network Exposure Function) and PCF (Policy Control Function)). Information related to the UE subscription is retrieved and further configuration information for configuration of the application client 10 and the core network 50 is generated.

The configuration information generated by the network operator platform 40 for configuration of the core network 50 includes:

i. An instruction for the core network 50 to associate the generic identifier (generic_ID) with the UE subscription for the network slice (e.g. S-NSSAI-a 110) to be used for the specialised category of service in which data generated by the application is classified.

ii. An instruction for the core network 50 to associate the betokened DNN with the UE subscription for the network slice (e.g. S-NSSAI-a 110) to be used for the specialised category of service in which data generated by the application is classified.

iii. An instruction for the core network 50 to generate a further, new URSP (here denoted a second URSP) to be sent to the UE. The second URSP associates a traffic descriptor (TD) for the specialised category of service in which data generated by the application is classified with the betokened DNN (token_DNN) and the network slice for the specialised service category. A route selection descriptor in the second URSP does not include any DNN. The rule precedence value of the second URSP is given a value relative to the first URSP (generated as part of the registration accept message in step 4) so as to force the evaluation of the second URSP at the UE before evaluation of the first URSP.

An example of the second URSP is:

| Rule Precedence = x − n | Route Selection Descriptor |
|---|---|
| Traffic Descriptor: | Precedence = 1 |
| Connection Capabilities = "first specialised service category" | Network Slice Selection: S-NSSAI-a |
| DNN = token_DNN | Access Type preference: 3GPP access | iv. An instruction for the core network 50 (specifically, the repository containing subscriber policies) to allow the betokened DNN (token_DNN) for the particular subscriber and to exchange the betokened DNN to another specified or predefined DNN, upon receipt at the core network of a communication session request addressed to said betokened DNN (token_DNN). The specified DNN is a real or true address for access to the data network on which the application server resides. In some case, a specified DNN may be selected by the core network in view of instantaneous network conditions or in view of data network conditions alerted by the network operator platform.

v. Optionally, an instruction to alert the network operator platform 40 upon changes in the geographical location of the UE 5. This could trigger reconfiguration by the network operator platform, for instance by repetition of some steps of the described method.

vi. Optionally, an instruction to alert the network operator platform 40 if the application is started or stopped. This could trigger timing actions related to (re)configuration of the application client and the core network.

vii. Optionally, charging information and quality of service (QoS) information relevant to the specific application in the UE 5.

viii. In some cases, a specific DNS server 60 in the core network 50 to be used in a subsequent communication session may be identified The information retrieved by the network operator platform 40 from the UDR (Unified Data Repository) through the UDM at the core network 50 includes the subscription information related to use of Multi-Access Edge Computing (MEC) services by the UE 5. This can be used for configuring the application client 10 with information related to use of Edge Computing features.

The configuration information collated or generated by the network operator platform 40 for configuration of the application client 10 includes:

a) The betokened DNN (token_DNN), to be used in a subsequent request for a communication session between the application client 10 and the application server 70.

b) Optionally, an instruction to use the network operator's Domain Name Server (DNS) over Hypertext Transfer Protocol Secure (HTTPS) (DoH) to resolve the application server address via a DNS server 60 at the core network 50, in case the subscriber has subscribed to Edge Computing services provided by the network operator itself or in agreement with an application provider. A specific DNS server 60 in the core network 50 to be used may be identified.

Step 15: The network operator platform 40 provides the core network configuration information to the core network 50, and it is used to configure the same.

Step 16: The core network reconfiguration triggers a configuration update message to the UE 5 using non-access stratum signalling according to standard procedures depicted in 3GPP TS 23.502. The configuration update message includes the second URSP generated by the network operator platform 40 at step 14 (configuration information iii of step 14).

Step 17: After receipt of the configuration update message, the URSP repository 20 at the UE 5 is updated with the second URSP.

Step 18: The network operator platform 40 provides the application client configuration information to the application client 10, and the application client configuration information is used to configure the application client 10.

Phase D: Execution

Figure 3:
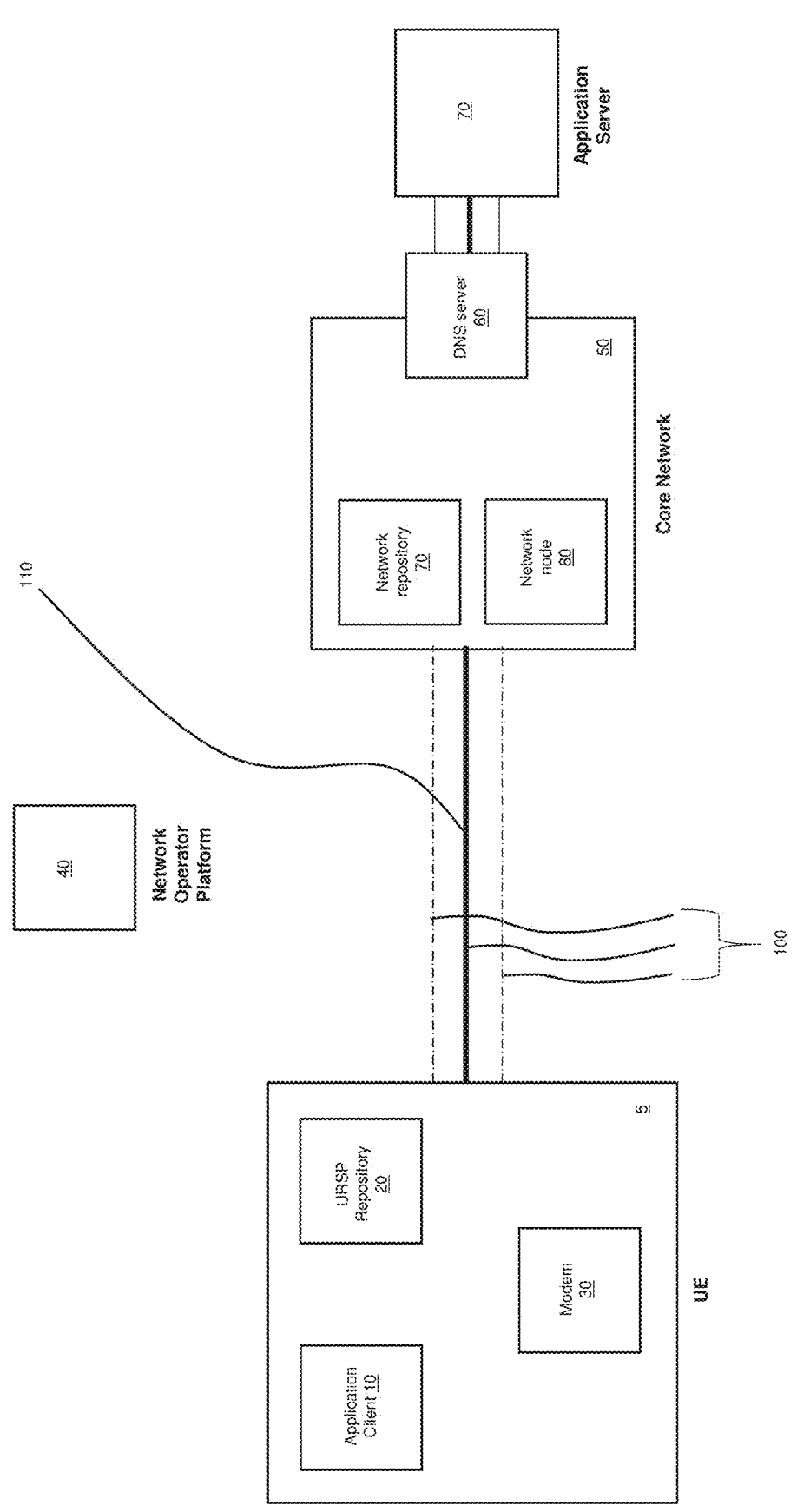
FIG. 3 shows elements of the same system during establishment of the communication session between the application client and the application server via a core network of a cellular network.

In this phase, an application client initiates a new communication session between the application client and the application server via the core network. The communication session is established according to the configuration that was imposed in phase C. Entities during the execution phase D are depicted in FIG. 3.

The steps for phase D include:

Step 19: The application client 10 sends a request for a new communication session between the application client 10 and the application server 70. The request from the application client 10 to the UE 5 modem layer 30 includes the betokened DNN (token_DNN) and an identification of the specialised category of service to be used by the application (here, the first specialised category of service) as a traffic descriptor (TD). The request from the application client 10 may include an request to obtain the DNS server address for further resolution of the application server address via a DNS server 60 at the core network 50. This could be done if the application client has not been configured with DNS settings in the configuration phase.

Step 20: The UE 5 (specifically the modem layer 30) consults the URSP repository 20 and identifies the second URSP (as previously provided at step 14), associating the betokened DNN (token_DNN) and the first specialised category of service with the first network slice (S-NSSAI-a 110).

Step 21: A request to establish the new communication session is sent by the UE 5 to the core network 50 (specifically to the access and mobility management function (AMF) in the control plane of the core network 50). The request addresses the betokened DNN (token_DNN) via the network slice for the first specialised category of service (S-NSSAI-a 110).

Step 22: The core network 50 (for instance, at the control plane level) changes the betokened DNN (token_DNN) for the specified DNN (as specified in configuration information iv of step 14). The request for the communication session is sent to the specified DNN.

Step 23: If configured to use the network DNS server, then a DNS query, using DoH if so configured in the application client, is signalled from the application client 10 towards the DNS server 70 located in the operator's network, to obtain the application server address that the application client 10 intends to communicate with.

Step 24: A communication session is connected between the application client 10 and the application server 70 over the network allocated network slice, S-NSSAI-a 110, and according to specific handling or treatment by the network operator.

The network operator specific handling or treatment can be assigned by the network operator because the network operator has knowledge of the origin and nature (including the identity of the specific application and the UE) of the data traffic within the communication session. Network operator assigned attributes for the data handling may allow the data traffic in the communication session to be directed to a specific peering point or server that has been established by means of agreements between a network operator and the application provider. In addition or alternatively, the data traffic can be re-routed under control of the network operator (for instance, in view of UE mobility, network congestion, or other instantaneous network conditions). In still further examples, knowledge of the provenance of the data traffic permits the data traffic to be provided special treatment, for instance to use a different radio type or band, or to split the traffic into fixed and mobile access, or to be given a guaranteed bit rate that might have been agreed in contract with the user or the app provider. Finally, knowledge of the provenance of the data traffic by the network operator may allow the operator to monetise specific data traffic with more precision or granularity.

It will be understood that features disclosed herein may be combined in any way and are not limited to the specific implementation described above. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as "a" or "an"

means "one or more". Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise. All of the aspects and/or features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A method for routing data through a cellular network from an application client at a User Equipment, UE, to an application server via the core network, the method comprising:

receiving, at a network operator platform from a UE, an initial request for establishment of a communication session between the application client and the application server, the communication session to be routed via a network slice, the network slice for routing of data belonging to a category of data traffic sent from the application client to the application server;

generating, by the network operator platform, configuration information for configuration of the application client for establishment of the communication session, the application client configuration information comprising:

an instruction to the application client to address a subsequent request for establishment of a communication session with the application server to a token Data Network Name, DNN;

generating, by the network operator platform, configuration information for configuration of the core network for establishment of the communication session, the core network configuration information comprising:

an instruction for the core network to change the token DNN for a specified DNN upon receipt of a request for establishment of a communication session addressed to said token DNN;

an instruction for the core network to generate a UE Route Selection Policy, URSP, to be sent to the UE, the generated URSP rule associating the category of data traffic sent from the application client to the application server with the token DNN and the network slice;

configuring the application client according to the application client configuration information;

configuring the core network according to the core network configuration information, thereby causing the core network to send the generated URSP to the UE to be stored in a URSP repository at the UE;

wherein after configuring the application client and the core network, the subsequent request for establishment of a communication session between the application client and the application server is sent from the application client via the network slice, indicating the category of data traffic and addressed to the token DNN, the core network identifying information on the data in the communication session and the application client from which it is routed by receipt of the token DNN, in order to facilitate specific handling or treatment for the communication session by the network operator.

2. The method of claim 1, wherein the token DNN is a dummy DNN that is not a real network address and wherein the token DNN signals to the network operator platform information on the application client and the UE and a type of data to be routed through the communication session.

3. The method of claim 1, further comprising:

receiving, at the core network, the subsequent request for establishment of a communication session from the application client via the network slice and addressed to the token DNN according to the generated URSP;

changing, at the core network, the token DNN for the specified DNN;

establishing a communication session between the application client and the application server via the specified DNN and the network slice and having network assigned attributes.

4. The method of claim 1, wherein the configuration information for configuration of the core network further comprises one or more of:

an instruction for the core network to associate the subsequent request for establishment of a communication session with a UE subscription for use of the network slice;

an instruction to alert the network operator platform of changes in the geographical location of the UE;

an instruction to alert the network operator platform if the application is started or stopped;

an instruction to alert the network operator platform of network conditions that may affect the quality of service relevant to the application client; and information relating to a Domain Name System, DNS, server at the core network to be used to resolve an IP address for the application server during establishment of a communication session.

5. The method of claim 1, wherein the configuration information for configuration of the application client further comprises:

an instruction to use DNS over Hypertext Transfer Protocol Secure, HTTPS, to address the DNS server; and/or information relating to a Domain Name System, DNS, server at the core network to be used to resolve an Internet Protocol, IP, address for the application server during establishment of a communication session.

6. The method of claim 1, wherein the core network configuration information and/or application client configuration information is generated by interaction by the network operator platform with network repositories and configuration nodes at the core network in view of an identifier of the UE and an identifier associated with the application client requesting access to the network slice.

7. The method of any one of claim 6, further comprising, after the step of receiving the initial request for establishment of a communication session between the application client and the application server:

obtaining, by the network operator platform from the application client, authorisation from an end user of the application client to share information to identify to the core network a provenance of data originating from the application client; and/or obtaining, by the network operator platform from the core network, authorisation for the application client to use the network slice.

8. The method of claim 7, wherein obtaining the authorisation from an end user of the application client to share information to identify to the core network a provenance of data originating from the application client further comprises receiving, from the application client as authorisation, an application identifier associated with the application client requesting access to the network slice; and/or obtaining the authorisation for the application client to use the network slice further comprises receiving, as authorisation, a UE identifier corresponding to a subscription of the UE to use the network slice;

wherein the core network configuration information and/or application client configuration information being generated by interaction by the network operator platform with network repositories and configuration nodes at the core network in view of an identifier of the UE and an identifier associated with the application client requesting access to the network slice comprises:

constructing a generic identifier from the UE identifier and the application identifier;

wherein the configuration information for configuration of the application client and for configuration of the core network is generated by interaction by the network operator platform with network repositories and configuration nodes at the core network using the generic identifier.

9. The method of claim 8, wherein the core network configuration information further comprises:

an instruction to the core network to store the generic identifier together with subscriber data associated with the network slice and both the token DNN and the specified DNN.

10. The method of claim 1, wherein the initial request for establishment of a communication session between the application client and the application server is routed between the application client and the network operator platform via the network slice and addressed to a network operator platform DNN.

11. The method of claim 10, wherein the initial request for establishment of a communication session between the application client and the application server is routed from the UE according to an initial URSP stored in the URSP repository in the UE, the initial URSP associating the category of data traffic sent from the application client with the network operator platform DNN and the network slice.

12. The method of claim 11, wherein the initial URSP is updated in or added to the URSP repository at the UE upon an initial registration of the UE with the core network, or by preconfiguration in the URSP repository at the UE by a network operator prior to initial registration of the UE with the core network.

13. The method of claim 11, wherein the generated URSP and initial URSP have relative rule precedence values that forces evaluation of the generated URSP before the initial URSP.

14. A User Equipment, UE, in a cellular network and comprising a processor and a non-transitory computer readable storage device having stored thereon computer executable instructions, that, when executed by the processor, cause the UE to perform the method of claim 1.

15. An entity of a core network of a cellular network comprising a processor and a non-transitory computer readable storage device having stored thereon computer executable instructions that, when executed by the processor, cause the entity to perform the method of claim 1.

16. A network platform entity in a cellular network comprising a processor and a non-transitory computer readable storage device having stored thereon computer executable instructions that, when executed by the processor, cause the network operator entity to perform the method of claim 1.

* * * * *